UNITED STATES PATENT OFFICE.

PAUL FRIEDLAENDER, OF VIENNA, AUSTRIA-HUNGARY, ASSIGNOR TO THE FIRM OF KALLE AND COMPANY AKTIENGESELLSCHAFT, OF BIEBRICH, GERMANY.

RED SULFUR DYE AND PROCESS OF MAKING SAME.

No. 819,348.     Specification of Letters Patent.     Patented May 1, 1906.

Application filed November 16, 1905. Serial No. 287,728. (Specimens.)

*To all whom it may concern:*

Be it known that I, PAUL FRIEDLAENDER, doctor of philosophy, a subject of the Emperor of Austria-Hungary, residing at Vienna, Austria-Hungary, have invented certain new and useful Improvements in a Red Sulfur Dye and Process of Making Same, of which the following is a specification.

This invention relates to the manufacture of a new red coloring-matter.

I have found that the chemical compounds described in my application for Letters Patent, Serial No. 287,727, bearing the same date, the constitution of which is defined by the following general formula:

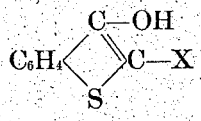

in which formula X stands for a hydrogen atom (H) or for a carboxylic group (COOH) having the property to be easily transformed by the action of oxidizing agents into a red sulfur containing coloring-matter, to which most probably the constitution corresponding to the following formula may be ascribed:

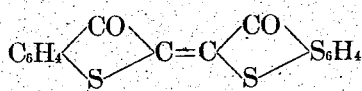

The compound

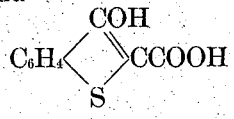

I call "thio-indoxyl-carboxylic acid." The compound

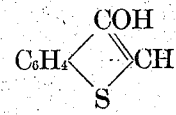

I call "thio-indoxyl."

The new coloring-matter is in the dry state a red powder which sublimes on heating without decomposition, forming brilliant bronze-colored needles. The new coloring-matter dissolves with great difficulty in the usual solvents. The solution in chloroform is a fine red with a splendid yellow fluorescence. On treating the coloring-matter with reducing agents an almost colorless or yellow solution is obtained, from which the coloring-matter can be separated by oxidation—viz., the access of air—and its application to dyeing is based on this property. Red dyeings of excellent fastness are obtained both on animal and vegetable fibers.

In the following I give a series of examples in which various modes of the production of the new coloring-matter by oxidizing thio-indoxyl or thio-indoxyl-carboxylic acid are described.

Example 1: 19.4 kilograms of thio-indoxyl-carboxylic acid are dissolved in about eighty kilograms caustic-soda lye of 40° Baumé. This solution is then mixed with a solution of potassium ferricyanid as long as a red precipitate forms. The isolation of the coloring-matter is effected by filtering, washing, and obtaining it either as a paste or as a red powder after drying.

Example 2: A current of air is passed through a weak alkaline solution or through an aqueous suspension of thio-indoxyl-carboxylic acid until the coloring-matter ceases to be formed in a test portion by further treatment with air. The isolation of the coloring-matter can be effected as above described. By this method not as good results are obtained as by the process given in Example 1.

Example 3: 19.4 kilograms of thio-indoxyl-carboxylic acid are dissolved in water by the addition of one hundred kilograms of caustic soda of 40° Baumé. A solution of thirty-seven kilograms of ferric chlorid ($Fe_2Cl_6$) is then added. The mixture is heated, and while it is being stirred hydrochloric acid is slowly added until the mass is decidedly acid. Carbon dioxid is evolved simultaneously with the separation of the red coloring-matter. It is filtered while hot and well washed. The filtrate contains neither thio-indoxyl-carboxylic acid nor thio-indoxyl.

Example 4: 19.4 kilograms of thio-indoxyl-carboxylic acid are dissolved in water by the addition of twenty-four kilograms of caustic-soda lye of 40° Baumé. A solution of potassium bichromate containing about 9.3 kilograms of $K_2Cr_2O_7$ is then added. The mixture is heated, and while it is being stirred an excess of hydrochloric acid is slowly added. Carbon dioxid is evolved with simultaneous formation of the red coloring-matter, which separates in an easily-filterable form. The further treatment of the coloring-matter is the same as hereinbefore described. In lieu of the isolated thio-indoxyl-carboxylic acid a corresponding quantity of the reaction product obtained in its manufacture may be used.

Example 5: Seventy-five kilograms of a paste containing twenty per cent. of thio-indoxyl are dissolved in two hundred liters of water by the addition of twelve kilograms of caustic-soda lye of 40° Baumé. To the solution of sodium thio-indoxyl thus obtained thirty-six kilograms of caustic-soda lye of 40° Baumé are added. A solution of potassium ferricyanid is run into the solution under good agitation at ordinary temperature so long as a red precipitate is formed. The precipitate is filtered and washed, and the coloring-matter is used in the form of a paste or is dried.

Example 6: Through a cold or moderately-heated solution of thio-indoxyl or of thio-indoxyl sodium, as prepared in Example 1, a current of air is passed until no more precipitate is formed in a filtered test portion by further treatment with air. The precipitate is then filtered and washed a little, and the coloring-matter is used as paste or is dried.

Example 7: To a solution of thio-indoxyl sodium prepared as explained in Example 5 a solution containing forty kilograms of ferric chlorid is added. The solution is then heated, an excess of mineral acid is added, and the mass is then boiled for a short time. The separated coloring-matter is filtered and well washed. No indoxyl can now be detected in the filtrate.

Example 8: To a solution of thio-indoxyl sodium prepared as explained in Example 5 is added a solution of potassium bichromate containing twenty kilograms of $K_2Cr_2O_7$. The solution is acidified, stirred some time, filtered, and washed.

In the foregoing examples the mode of preparation of the new coloring-matter is described in a general way; but I do not bind myself to the proportions stated nor to the mode of operation nor to the oxidizing agents mentioned.

Now what I claim is—

1. As a new process the manufacture of a red sulfur containing coloring-matter by acting with oxidizing agents on the thio-indoxyl compounds having the following constitution:

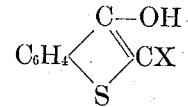

in which formula X stands for a hydrogen atom (H) or for a carboxylic group (COOH).

2. As a new product the sulfur-containing coloring-matter obtained by oxidizing thio-indoxyl compounds and having very probably the following constitution:

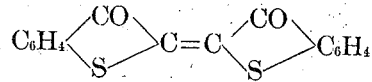

which is in the dry state a red powder difficultly soluble in the usual solvents, which sublimes on heating without decomposition forming brilliant bronze-colored needles and gives on treatment with reducing agents a yellow solution, from which the coloring-matter is reprecipitated by the access of air, and which produces on the textile fibers red shades of excellent fastness.

In testimony whereof I have signed my name to this specification in the presence of two subscribing witnesses.

PAUL FRIEDLAENDER.

Witnesses:
   IGNAS ROSENBERG,
   JEAN GRUND.